Aug. 26, 1924.
J. H. LEHMAN
1,506,185
CASING OR BEARING FOR VALVES OR OTHER MOVING PARTS
Original Filed Sept. 27, 1922
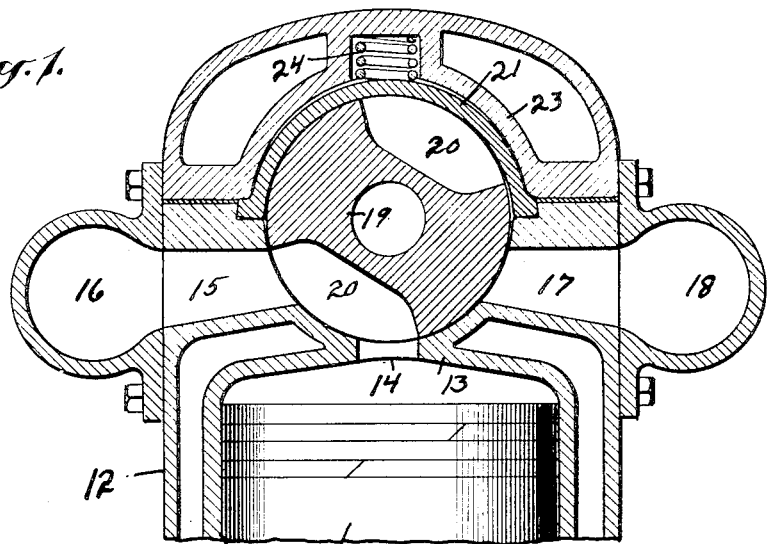
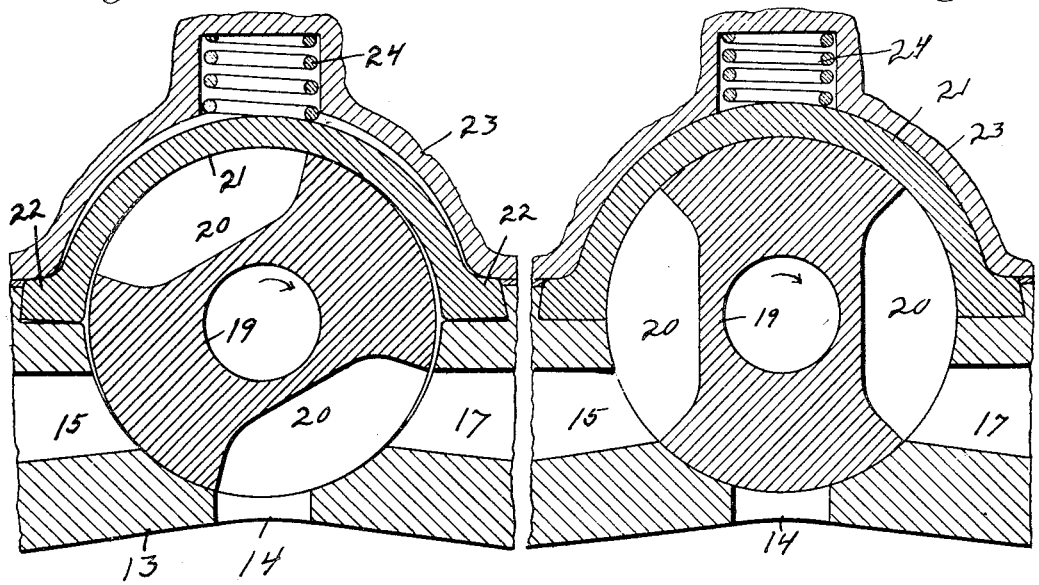
Inventor
Joseph H Lehman
By his Attorneys Patented Aug. 26, 1924.

1,506,185

UNITED STATES PATENT OFFICE.

JOSEPH H. LEHMAN, OF HASBROUCK HEIGHTS, NEW JERSEY.

CASING OR BEARING FOR VALVES OR OTHER MOVING PARTS.

Application filed September 27, 1922, Serial No. 590,810. Renewed November 14, 1923.

*To all whom it may concern:*

Be it known that I, JOSEPH H. LEHMAN, a citizen of the United States, and resident of Hasbrouck Heights, in the county of Bergen and State of New Jersey, have invented certain new and useful Improvements in Casings or Bearings for Valves or Other Moving Parts, of which the following is a specification.

This invention is an improvement in bearings for moving parts, and the main object is to provide a proper running fit and substantially uniform clearance under varying conditions of operation, and particularly varying temperature conditions.

My invention in its broad aspect is useful in a wide variety of movable members which must be supported or guided with very slight clearance, and which are subjected to varying conditions during use.

More specifically my invention is adapted for use with rotary valves subject to varying temperatures which cause expansion and contraction of the parts. For instance, the rotary valve of an internal combustion engine while operating varies in temperature from that of the atmosphere at the start to or approximating that of boiling water after the engine has been running for a few minutes. This range is greater in winter than in summer, and the high limit may under some conditions exceed that of boiling water if the water be low in the jacket or the overflow outlet be closed or obstructed to give steam pressure, or if the engine is not water cooled, or if friction or defective lubrication locally increases the temperature.

Efficiency requires that the valve be sufficiently tight to prevent leakage under all operating conditions, but with ordinary constructions the expansion of the valve will cause it to bind at high temperature if it fitted properly at low temperature, and will leave it too loose and subject to objectionable leakage at low temperature if it fitted properly when heated. This is due in part to the fact that the valve and valve casing do not expand at the same rate, and the diameter of the aperture or valve seat in the casing does not follow the diameter of the valve even though they are subjected to the same changes in temperature.

Many attempts have been made to overcome this difficulty, but so far as I know, none is entirely satisfactory. In my improved construction I provide the casing or bearing member with a liner or liner section so mounted and so designed that its expansion under heating increases the diameter of the aperture or valve seat at substantially the same rate that the same heating effect increases the diameter of the valve or other supported and movable member. Thus there is maintained a substantially uniform running fit or clearance under all operating conditions.

In my improved construction the diameter of the aperture in the casing is increased or decreased by the positive and definite movement of a part of the casing upon changes in temperature of said part, and is to be distinguished from such constructions as permit an expansion of the valve itself by a spring pressed casing part which may back off against the spring by the pressure of the valve thereon.

In the accompanying drawings I have shown merely one embodiment of my invention, and have shown it as applied to an internal combustion engine of the four-cycle type. In the drawings:

Fig. 1 is a longitudinal section through the cylinder head showing the valve in intake position.

Fig. 2 is a view similar to a portion of Fig. 1, but showing the valve in exhaust position, and with the size of some of the parts and the clearances greatly exaggerated to facilitate a clear disclosure of the parts when cold or contracted, and Fig. 3 is a view similar to Fig. 2, but showing the valve in the position which it occupies at the end of the compression stroke, and with the parts hot or expanded.

I have illustrated the invention as applied to an internal combustion engine having a cylinder 10 provided with a piston 11 and a water jacket 12. The cylinder head 13 has a single port 14 which may be connected by passages 15 with the intake manifold 16, or by a passage 17 to the exhaust manifold 18. The valve member 19 has a pair of passages 20, and is rotated in a clockwise direction by suitable four-to-one gearing, whereby the valve makes a half revolution for each complete four-stroke cycle of the engine. The valve is shown in wide-open intake position in Fig. 1. A rotation to the position shown in Fig. 3 closes the port 14 during the compression and power strokes. A further rotation to the position shown in Fig. 2 opens the port 14 to the exhaust 17, The parts so far described are not new with me, and neither the details thereof nor the specific arrangement forms any important part of my invention when the latter is broadly considered.

In the specific form illustrated I carry out my invention by providing a liner or liner section 21 forming a part of the valve casing or bearing for the valve. This is shown as extending along substantially one-half of the circumference or periphery of the valve seat, and diametrically opposite to the port 14. The member 21 may be a plate of substantially uniform thickness, and its ends are preferably anchored to the main section of the valve casing, whereas the intermediate portion is free to move radially in respect to the valve. The anchoring of the ends of this plate is accomplished in the form illustrated by radially projecting lugs or terminal portions 22. These may be clamped to the main section of the valve casing or the cylinder head, or they may be held beneath a cover or top section 23 of the valve casing.

This member 21 is so constructed and so designed that it expands in the direction of its length by increase in temperature, but as the end portions are anchored this expansion tends to bulge or bow up the intermediate or free part. The proportioning of the parts in respect to their relative rates of expansion is such that when the member 21 is expanded to the full extent such as would occur under the highest normal operating conditions of the engine, the valve seat or aperture will be substantially cylindrical, and will be of substantially the same diameter as the diameter of the valve itself when the latter is heated to the same temperature. It will of course be understood that the valve diameter and the valve seat diameter are not exactly the same under these conditions as there is provided the slight clearance which permits the valve to turn freely. This position of the parts is shown in Fig. 3, but I have not illustrated the slight clearance amounting to .001 of an inch or thereabouts between the valve and the valve casing, nor have I illustrated the slight clearance which would be left between the outer surface of the intermediate portion of the member 21 and the valve casing section 23, even under the high temperature operating conditions.

When the engine is cold the valve is contracted to a smaller diameter, but this same temperature change causes a reduction in the linear distance between the two ends 22 of the member, and the intermediate portion moves downwardly as indicated on exaggerated scale in Fig. 2. With the parts properly designed the shortening of the member 21 will be such in proportion to the reduction in diameter of the valve 19 when the parts are cold, that there will be the same running fit or clearance between the valve 19 and the upper and lower sides of the valve seat, that is, the portion of the casing having the port 14, and the portion of the under side of the member 21 diametrically opposite to the port 14. There may be increased clearance between the valve and the valve seat at points in the vicinity of the ends of the member 21, but this is immaterial as the important point is that the valve shall be held in proper relationship to the port 14, and leakage from said port along the sides of the valve will be prevented.

I do not wish to be limited to the maintaining of a valve seat diameter exactly equal to the valve diameter under all temperature conditions, as satisfactory results will be secured even though the clearance might be very slightly greater at one temperature than at another, but I do seek to maintain a substantially uniform clearance and the preventing of the movement of the valve away from the port 14 to a sufficient extent to permit leakage at any temperature condition.

During the power stroke the upward pressure on the valve at the port 14 is very great, but this pressure may be entirely resisted by the member 21 and the anchoring of the ends of the latter. Preferably I provide auxiliary means for resisting the strain on the anchorage points and preventing stretching of the member 21 by the upward pressure of the valve 19 during power strokes of the piston. As shown, I provide a heavy shock spring 24 in the valve casing section 23, and pressing against the outer surface of the member 21 substantially diametrically opposite to the port 14. The pressure of this spring is preferably substantially equal to the mean upward pressure of the valve during running conditions. Thus the member 21 is relieved to a large extent of any strains or forces tending to change its position or length except as a result of changed temperature conditions.

As the member 21 is in contact with the valve 19, and as both are good heat conductors, it will be seen that an increase or decrease of the temperature of one will cause a corresponding and immediate change in the temperature of the other. This temperature changing will ordinarily be due to the outside atmosphere and the high temperature gases in the cylinder when the engine is running, but it is apparent that it might be due under some conditions to other causes. For instance, in case of defective lubrication the friction of the valve 19 on the member 21 might generate excessive heat, but this heat would cause an expansion of the member 21 and prevent the parts from further binding. A reduction in friction with a corresponding drop in temperature would cause the parts to contract so that under all conditions the same or approximately the same clearance is maintained.

Although I have illustrated and described my invention in connection with a rotary valve or an internal combustion engine, it will be evident that the same principle is applicable to the bearings or casings for other moving parts, particularly where they are subjected to expansion and contraction as a result of temperature change.

Having thus described my invention, what I claim as new and desire to secure by Letters Patent is:

1. In combination, a rotary valve and a valve casing therefor having a liner member extending along a portion of the periphery of the valve, the intermediate portion of said liner member being movable radially to maintain substantially uniform clearance with said valve during variations in the temperature of said valve and said liner member.

2. In combination, a valve casing, a rotary valve mounted therein, and a liner member extending along substantially one half the periphery of the valve, the terminal portions of said liner member being anchored and the intermediate portion being free to move radially.

3. In combination, a valve casing, a rotary valve mounted therein, and a liner member extending along substantially one half the periphery of the valve, the terminal portions of said liner member being anchored and the intermediate portion being free to move radially, whereby linear expansion to such liner member, and radial expansion of said valve maintain substantially uniform clearance for the valve under all normal temperature conditions of operation.

4. In combination, a valve casing, a rotary valve mounted therein, a liner member extending along substantially one half the periphery of the valve, the terminal portions of said liner member being anchored and the intermediate portion being free to move radially, and a resilient member normally pressing the intermediate portion of said liner member toward said valve.

5. An internal combustion engine having a port, rotary valve for controlling said port, and a valve casing member extending along substantially one half the circumference of the valve and diametrically opposite to said port, the terminal portions of said member being anchored and the intermediate portion being movable toward and from said port by temperature change of said member to maintain uniform clearance with said valve under varying temperature conditions of the latter.

6. A valve casing having a port and a substantially semi-cylindrical casing member diametrically opposite to said port, said casing member having its terminal portions anchored and its intermediate portion movable radially upon linear expansion and contraction of the member, whereby the internal diameter of the valve casing increases upon increase in temperature.

7. A valve casing having a port and a casing member diametrically opposite to said port, said casing member having its terminal portions anchored and its intermediate portion movable radially upon linear expansion and contraction of the member, whereby the internal diameter of the valve casing increases upon increase in temperature, and a rotary valve within said casing subjected to the same temperature change as said casing member, the relative rates of expansion of the valve and member under varying temperature conditions being such as to maintain a substantially uniform clearance.

8. In combination, a rotary member and a bearing therefor, said bearing including a semi-cylindrical member having its terminal portions anchored and its intermediate portion movable radially upon changes in temperature whereby clearance between said rotary member and said casing is maintained substantially uniform.

9. In combination, a casing having an aperture, a rotary member within said aperture, and a member engaging with the periphery of the rotary member and adapted to expand to increase the diameter of the aperture upon increase in temperature to maintain a substantially uniform running fit with said rotary member under varying temperature conditions.

10. In combination, a rotary valve and a valve casing therefor having a member engaging with a portion of the periphery of the valve, said portion of said member being movable radially independently of said valve during variations in the temperature of said valve and said member.

11. A valve casing having an aperture including a member adapted to move radially upon changes in temperature of the member itself to vary the internal diameter of the casing.

12. A valve casing having an aperture including a member adapted to move radially upon changes in temperature of the member itself to vary the internal diameter of the casing, and a rotary member within said aperture, said first mentioned member being rigid against pressure thereon by said rotary member.

13. In combination a valve casing having an aperture and a cylindrical rotary valve within said aperture, a portion of the peripheral wall of said aperture being formed of a member adapted to receive heat from and be maintained at substantially the same temperature as said valve and mounted to move in a radial direction by its own expansion upon being heated.

14. In combination a valve casing having an aperture and a cylindrical rotary valve within said aperture, a portion of the peripheral wall of said aperture being formed of a member adapted to receive heat from and be maintained at substantially the same temperature as said valve and mounted to move in a radial direction by its own expansion upon being heated, said member being rigidly supported to resist radial movement by pressure thereon from the valve itself.

Signed at New York in the county of New York and State of New York this 26th day of September A. D. 1922.

JOSEPH H. LEHMAN.